United States Statutory Invention Registration [19]

[11] Reg. Number: H960

Huerta

[43] Published: Sep. 3, 1991

[54] DISCARDING ROTATING BAND/OBTURATOR

[75] Inventor: Joseph Huerta, Aberdeen, Md.

[73] Assignee: The United States of America as represented by the Secretary of the Army, Washington, D.C.

[21] Appl. No.: 417,615

[22] Filed: Oct. 4, 1989

[51] Int. Cl.[5] ..... F42B 13/16

[52] U.S. Cl. ..... 102/522

*Primary Examiner*—Harold J. Tudor

*Attorney, Agent, or Firm*—Anthony T. Lane; Edward Goldberg; Edward F. Costigan

[57] ABSTRACT

A discardable apparatus for mating with a full-caliber hollow tubular projectile. The apparatus being discardable after expulsion from a cannon barrel. The apparatus essentially of a simple, one-piece discardable obturator having an outer cylindrically engravable surface for imparting spin to a projectile during passage through the cannon barrel. The obturator has an interior cavity formed of a flat surface and a detachable pusher plate fitted on said flat cavity surface.

1 Claim, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PRIOR ART

DISCARDING ROTATING BAND/OBTURATOR

GOVERNMENT INTEREST

The invention described herein may be manufactured, used and licensed by or for the Government for governmental purposes without the payment to me of any royalties thereon.

BACKGROUND OF THE INVENTION

1. Technical Field

This invention relates to the field of hollow tubular projectiles which are launched at supersonic velocities in full caliber sizes from a gun. The objective of this invention is to provide a simple discarding mechanism which will impart spin and seal the propellant gases behind the base of a full caliber hollow tubular projectile that is traveling through the barrel of a weapon system. Upon exiting the barrel, the device separates from the projectile and the projectile continues to fly in a stable mode to target without the usual affixed rotating band required in launching conventional full bore projectiles.

As stated above, tubular projectiles are normally launched at supersonic velocities to achieve the desired flight performance and terminal effects at the target. Full caliber tubular projectiles have been launched with consistent success from guns with the normally affixed rotating bands to impart spin to the projectile The projection of the band from the body surface produces undesirable high drag at the supersonic flight conditions. This drag degrade the flight performance of the projectile. Since a tubular projectile is normally designed to fly in a low drag mode, the rotating band drag can be and usually is significant. There is no known prior art for such a simple device described herein that can provide obturation of gases and impart spin to a full caliber tubular projectile.

2. Prior Art

Numerous design efforts have been used to reduce total drag on projectiles and thereby increase their impact force.

Conventional ammunition projectiles such as used in small caliber and large caliber weapons typically comprise a solid mass with a rounded nose or ogive portion, a generally cylindrical body and an aft or tail portion terminating abruptly in a flat surface normal to the longitudinal center axis of the cylindrical body. Since such projectiles used in weaponry usually leave the gun tube or barrel at supersonic velocity, a relatively blunt nose produces very high drag force and the familiar parabolic shock wave. The blunt tail section results in considerable turbulence aft of the projectile which translates into further drag force from conversion of energy from the projectile to the surrounding mass of air.

To overcome some of the above stated problems, U.S. Pat. No. 4,301,736, entitled "Low Drag Tubular Projectile" was issued to Flatau and Huerta on Nov. 24, 1981. This invention discloses, as shown here at FIGS. 1 through 3, a hollow tubular projectile 20 having about thirty percent less mass than conventional ammunition projectiles and considerably less drag, as a result of precise aerodynamic design details.

In this invention, a hollow center passage through the projectile is found such as to form a tubular shape of circular form 22 and symmetrical about a center longitudinal axis 21 as shown at FIG. 1.

In FIG. 3, the force to launch the projectile 20 is applied to the projectile by use of a unitary force transmitting member which acts as an obturator 24 into which boattail surface 25 may be tightly nestled whereby element 24 transmits forward propulsion force through disc 26 to the projectile 20 being launched.

In addition, in launching a full size or full caliber tubular projectile 20, a rotating band 23 of soft metal, as seen at FIGS. 2 and 3, is generally affixed to the projectile or is made an integral part 23 of the body to the projectile 20 in order for the rifled weapons barrel to impart spin to the projectile 20 to permit the projectile 20 to fly in a stable mode. Such a permanently attached conventional rotating band 23 increases the overall drag of the projectile 20 in flight, hence reducing overall flight performance because of the high rate of deceleration and high drag profile.

Many devices have been utilized for launching tubular projectiles without rotating bands. In the prior art such devices are referred to as sabots. Sabots are used quite successfully in launching sub-calibered tubular projectiles from gun barrels. Such arrangement usually impose size limitations of the projectile body diameter and such a system can not launch full caliber tubular projectiles. There have been described, in the prior art very complicated devices that may launch full bore tubular projectiles from a gun. But, to date, it is not known that any simple device or mechanism sans complicated mating mechanisms, such as, pins, keyways, threading, sequential functioning of components to produce the desired action of the driving mechanism, etc., exists.

SUMMARY OF THE INVENTION

As will become clear hereinafter the discarding rotating band/obturator system, to reduce drag, eliminates the need for a permanently attached rotating band 23 on a full bore tubular projectile 20 (see FIGS. 2 and 3) body while at the same time providing the means for imparting the required spin to the projectile 20 in order to attain stability in flight.

It is an object of this invention to provide a combination of efficient and economical design components which eliminate the need for a permanently attached rotating band 23 on the tubular projectile 20 body.

A further object of this invention to provide a means of launching a projectile with low drag characteristics and thus more enhanced flight performance.

Yet another object of this invention is to allow the pusher disc 26 to be housed internal to the rotating band/obturator system.

Finally, another object of this invention is to allow the hollow tubular projectile through aerodynamic forces on its body to discard near the muzzle of the weapon after launch the rotating band/obturator system and the pusher disc.

The combination produces new and unobvious results upon which the claim features in this case are based.

These and other features of the present invention will be more readily understood from a consideration of the following description taken in connection with the accompanying drawings.

DESCRIPTION OF THE PREFERRED EMBODIMENT

Figure 1:
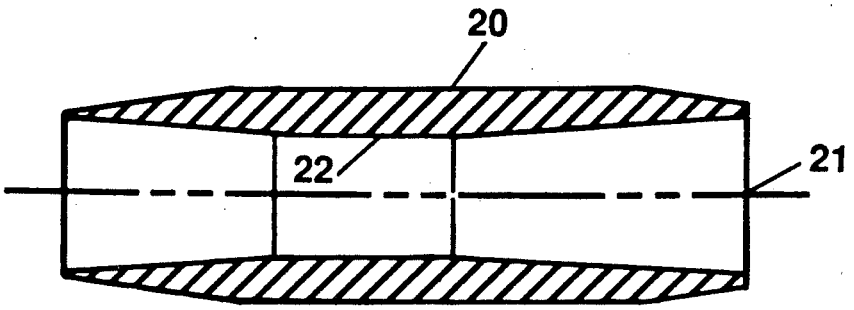
FIG. 1 PRIOR ART
FIG. 1 is an elevated cross-sectional view taken along a vertical plane containing the center longitudinal axis of a tubular projectile known to the prior art.
Figure 2:
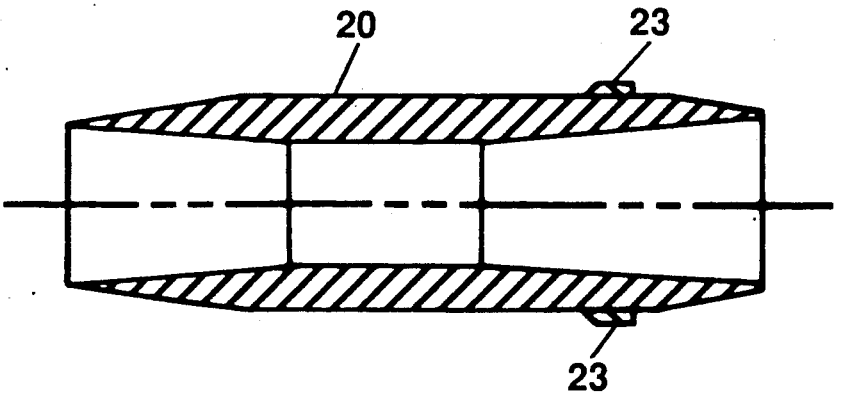
FIG. 2 PRIOR ART
FIG. 2 shows a cross-sectional view of a hollow tubular projectile and its side elevational view provided with a rotating band.
Figure 3:
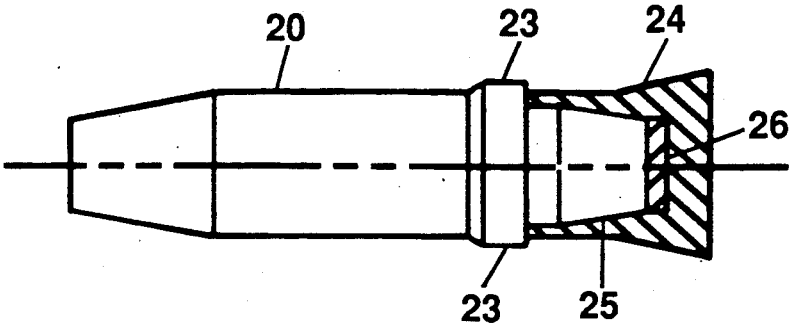
FIG. 3 shows a side view of a hollow tubular projectile with a permanently affixed rotating band and a cross-sectional view of an obturator housing a pusher disc.

The operation of the tubular projectile 20, 30 in FIGS. 1 through 3 is identical to that more particularly disclosed in U.S. Pat. No. 4,301,736, and therefore is not repeated herein.

Figure 4:
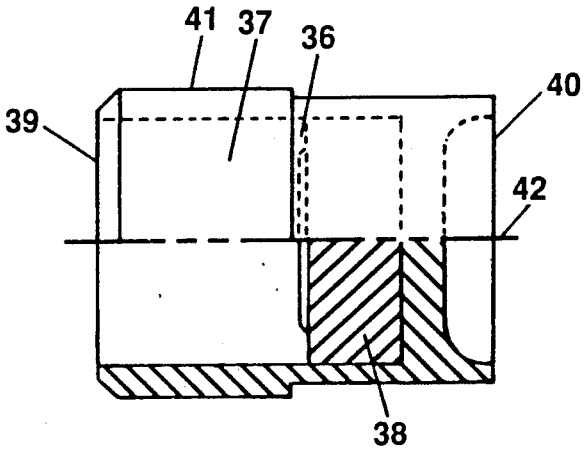
FIG. 4 shows a cross-sectional view of a combination rotating band/obturator system and pusher disc. The center longitudinal axis is shown at 42.
Figure 5:
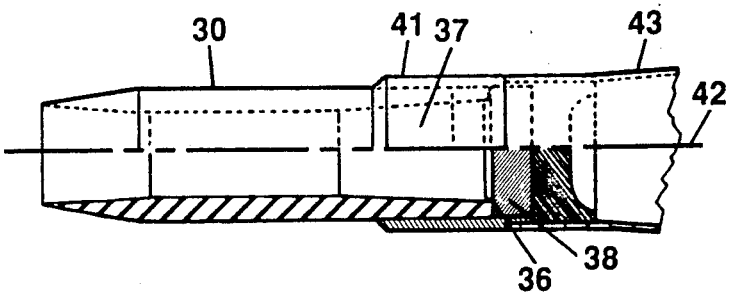
FIG. 5 is a cross-sectional view of the projectile mated with the rotating band/obturator and pusher disc inserted into a cartridge case to form the entire munition.

Referring to FIG. 4, the combination rotating band-/obturator device 37 is shown. The forward face 39 of this combination and its rearward face 40 are shown at FIG. 4. Rotation is caused by the projection 41 as it engraves on the rifling grooves while the device 37 is moving forward in the barrel. The steel pusher disc 38 is inserted into the device 37 to form a bearing surface for the tubular projectile base 36. The cartridge case shown at 43.

Figure 6:
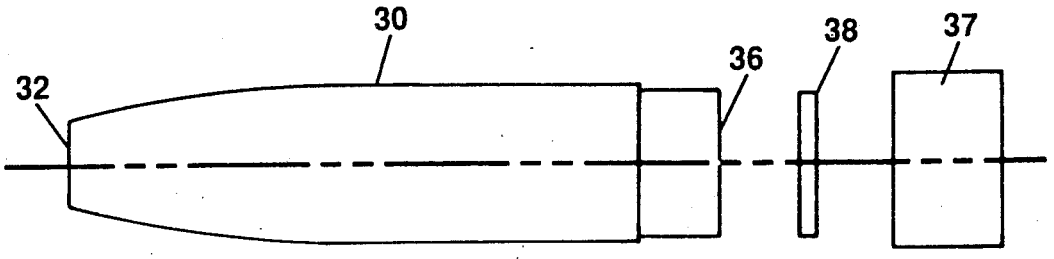
FIG. 6 shows a view of a tubular projectile in flight near the gun muzzle with another modification of the inventive rotating band/obturator and pusher disc separated from the projectile.

FIG. 6 shows a tubular projectile 30 in flight in the immediate vicinity of the muzzle of the weapon. The internal ram air in the projectile 30 produces sufficient pressure to cause separation of the tubular projectile 30 from the rear components 37, 38 allowing the "clean" projectile 30 to continue its flight downrange at the proper spin rate for stable flight. The rear components 37, 38 are the rotating band/obturator 37 and pusher disc 38 combination and are another modification of the inventive device. In this modification, the rifling grooves engrave the entire outer surface of 37. The separation of the device from the projectile base as shown in FIG. 6 has been proven by flash x-ray pictures taken during actual firing of a 40 mm tubular projectile configuration at the Ballistic Research Laboratory (BRL) Transonic Range located at the Aberdeen Proving Ground, Maryland.

Actual wind tunnel test data comparisons for a tubular projectile in supersonic flight with and without rotating band attached have established beyond any doubt that the drag resulting from the inventive concept is substantially less than that resulting from a permanently affixed rotating band. The data shown in the table below indicate an overall significant drag reduction of 14 percent. Furthermore, the concept of discarding the combination 37, 38 has been proven in these weapon firing tests.

| CONFIGURATION | DRAG COEFFICIENT |
|---|---|
| FIG. 1 Without Rotating Band (Wind Tunnel Test Data) | .124* |
| FIG. 2 Rotating Band Attached | .144* |

*Average Drag Coefficient

What is claimed is:

1. A discardable apparatus for mating with a full-caliber hollow tubular projectile, said apparatus being discardable after expulsion from a cannon barrel, consisting essentially of a simple, one-piece discardable obturator having an outer cylindrically engravable surface for imparting spin to said projectile during passage through said cannon barrel, said obturator having an interior cavity formed of a flat surface and a detachable pusher plate fitted on said flat cavity surface.

* * * * *